United States Patent
Chen et al.

(10) Patent No.: US 10,703,993 B2
(45) Date of Patent: Jul. 7, 2020

(54) METHOD FOR REFINING FUEL OIL

(71) Applicant: METAL INDUSTRIES RESEARCH AND DEVELOPMENT CENTRE, Kaohsiung (TW)

(72) Inventors: Teng-Chien Chen, Kaohsiung (TW); Chun-Hung Hung, Kaohsiung (TW); Chi-Hui Chen, Kaohsiung (TW)

(73) Assignee: METAL INDUSTRIES RESEARCH AND DEVELOPMENT CENTRE, Kaohsiung (TW)

( * ) Notice: Subject to any disclaimer, the term of this patent is extended or adjusted under 35 U.S.C. 154(b) by 0 days.

(21) Appl. No.: 16/226,233

(22) Filed: Dec. 19, 2018

(65) Prior Publication Data

US 2019/0185766 A1    Jun. 20, 2019

(30) Foreign Application Priority Data

Dec. 20, 2017  (TW) .............................. 106144717 A

(51) Int. Cl.
   *C10G 53/04*   (2006.01)
   *C10G 21/14*   (2006.01)
   *C10G 21/28*   (2006.01)
   *C10G 21/30*   (2006.01)

(52) U.S. Cl.
   CPC .............. *C10G 53/04* (2013.01); *C10G 21/14* (2013.01); *C10G 21/28* (2013.01); *C10G 21/30* (2013.01); *C10G 2300/1007* (2013.01); *C10G 2300/1011* (2013.01); *C10G 2300/1044* (2013.01); *C10G 2300/4012* (2013.01)

(58) Field of Classification Search
   CPC ........ C10G 53/04; C10G 21/14; C10G 21/28; C10G 21/30
   See application file for complete search history.

(56) References Cited

U.S. PATENT DOCUMENTS 7,597,794 B2 * 10/2009 Zhao ........................ C10C 3/16
                                                            208/251 R
2010/0032342 A1   2/2010 Marden
2013/0206642 A1   8/2013 Zhao et al.

FOREIGN PATENT DOCUMENTS

CN          105567319         5/2016

* cited by examiner

*Primary Examiner* — Brian A McCaig
(74) *Attorney, Agent, or Firm* — Muncy, Geissler, Olds & Lowe, P.C.

(57) ABSTRACT

A method for refining fuel oil comprises subjecting fuel oil to an extraction treatment with an extraction agent to extract a light component from the fuel oil, so as to obtain a light oil mixture containing the light component of the fuel oil and the extraction agent. The extraction agent is selected from the group consisting of a matter composed of oil and miscible with the light component of the fuel oil, a non-polar compound in a gaseous state at the room temperature and atmospheric pressure, and a combination thereof. The extraction agent is in a liquid state during the extraction treatment.

15 Claims, 2 Drawing Sheets

METHOD FOR REFINING FUEL OIL

CROSS-REFERENCE TO RELATED APPLICATION

This application claims priority of Taiwan Patent Application No. 106144717, filed on Dec. 20, 2017.

FIELD

This disclosure relates to a method for refining fuel oil, and more particularly to a method for refining fuel oil having a high viscosity.

BACKGROUND

Refining fuel oil to render the overall property thereof better so as to obtain, for example, fuel oil having higher combustion efficiency and less likely to contaminate the environment is the goal which the fuel manufacturing industry endeavors to achieve.

For instance, US 2013/0206642 A1 discloses a method for processing heavy oil, which comprises the following steps: (1) conducting a solvent deasphalting process using a heavy oil feedstock as feed with an extraction solvent in an extraction tower, and collecting de-asphalted oil and a de-oiled asphalt phase including the extraction solvent; (2) entering the de-oiled asphalt phase including the extraction solvent into a thermal cracking reactor after mixing the same with a dispersing solvent to conduct a thermal cracking process, so as to obtain a thermal cracking reaction product and coke; (3) leading out the thermal cracking reaction product, and separating therefrom the solvent, thermal cracking oil, and heavy gas oil; and (4) mixing the de-asphalted oil and the thermal cracking oil separated from the thermal cracking reaction product to obtain upgraded oil. In step (1), the extraction solvent used in the solvent deasphalting process is $C_3$-$C_6$ alkane, and the temperature and pressure of the extraction tower are respectively in the range of 80° C. to 250° C. and the range of 3.5 MPa to 10 MPa. The solvent deasphalting process serves to enable the extraction solvent to be in the supercritical fluid state, so that the asphalt phase in the heavy oil feedstock, which is a heavy component, and the carbon number of the hydrocarbon of which is not less than 33, can be extracted.

Furthermore, CN 105567319 B discloses a method for processing heavy oil, which comprises the following steps: subjecting heavy oil to a solvent deasphalting process in an extraction equipment, so as to obtain de-asphalted oil and de-oiled asphalt; and sequentially subjecting the de-oiled asphalt obtained to a hydrogenation process and a fractionation process, so as to convert the asphalt in the heavy oil to more valuable light oil. The extraction solvent used in the solvent deasphalting process is a $C_3$-$C_5$ hydrocarbon, and the temperature and pressure of the extraction equipment are respectively in the range of 50° C. to 90° C. and the range of 2 MPa to 4.5 MPa. The solvent deasphalting process serves to enable the extraction solvent to be in the supercritical fluid state, so that the asphalt in the heavy oil, the carbon number of the hydrocarbon of which is not less than 33, can be extracted.

In addition, US 2010/0032342 A1 discloses a method for re-refining lubricating oil. Specifically, a propane extraction process and a hydro-fining process are used in combination to recover and reuse waste lubricating oil. The propane extraction process is able to remove the asphalt, resin, additives, and metal compounds in the waste oil and to recover base oil fraction. The re-refining method comprises the following steps: (1) filtering waste lubricating oil through a multi-layer filter; (2) processing the waste lubricating oil in a cyclone separator to remove water from the waste lubricating oil after the waste lubricating oil has been filtered; (3) distilling the waste lubricating oil from the cyclone separator at 200° C. to 220° C. and −101.1 kPa in a flash tower to eliminate the trace amount of water and light hydrocarbon fraction in the waste lubricating oil; (4) introducing liquefied propane into the waste lubricating oil from the flash tower to form an oil/propane mixture, and heating the oil/propane mixture to 80° C. to 90° C.; (5) processing the oil/propane mixture through an extraction tower to perform sedimentation of the asphalt, resin, additives, and metal compounds from the oil; and (6) transferring the oil/propane mixture from the extraction tower to a propane recovery tower where propane is recovered from the mixture and the waste lubricating oil is ready for further processing. Generally speaking, lubricating oil contains a heavy hydrocarbon fraction, the carbon number of the hydrocarbon of which is not less than 33. Since liquefied propane is introduced to be mixed with the oil and the oil/propane mixture is heated to 80° C. to 90° C. in step (4), the propane can reach the supercritical fluid state upon the extraction.

In view of the foregoing, refinement of highly viscous fuel oil is complicated and costly due to the need of a supercritical fluid during extraction. Therefore, it is necessary to develop a cost-effective method for modifying or refining fuel oil having a high viscosity and a low flowability.

SUMMARY

Therefore, an object of the present disclosure is to provide a fuel oil refinement method that can alleviate at least one of the drawbacks of the prior art.

According to this disclosure, the method for refining fuel oil includes:
subjecting fuel oil to an extraction treatment with an extraction agent to extract a light component from the fuel oil, so as to obtain a light oil mixture containing the light component of the fuel oil and the extraction agent,
wherein the extraction agent is selected from the group consisting of a matter composed of oil and miscible with the light component of the fuel oil, a non-polar compound in a gaseous state at the room temperature and atmospheric pressure, and a combination thereof, and
wherein the extraction agent is in a liquid state during the extraction treatment.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Figure 1:
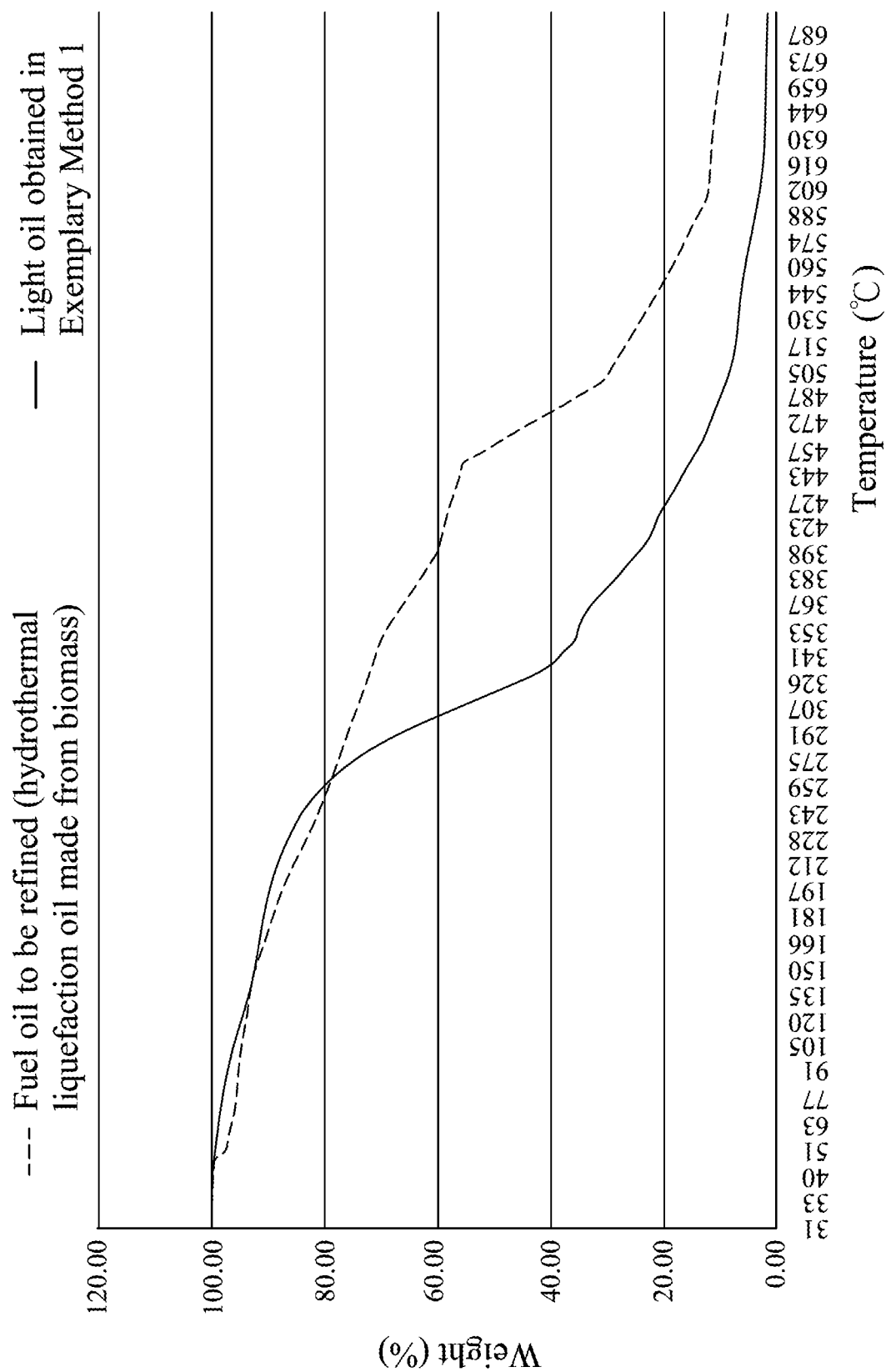
FIG. 1 is a thermogravimetric analysis diagram of fuel oil to be refined and light oil obtained in Exemplary Method 1 of the present disclosure.

In endeavoring to refine fuel oil having a high viscosity and a low flowability, the applicant surprisingly found that extracting a light component from such fuel oil using an extraction agent remaining in a liquid state during the extraction can cost-effectively give rise to a usable fuel having a lower viscosity and higher combustion efficiency.

Therefore, the present disclosure provides a method for refining fuel oil, which includes:

subjecting fuel oil to an extraction treatment with an extraction agent to extract a light component from the fuel oil, so as to obtain a light oil mixture containing the light component of the fuel oil and the extraction agent, wherein the extraction agent is selected from the group consisting of a matter composed of oil and miscible with the light component extracted from the fuel oil, a non-polar compound in a gaseous state at the room temperature and atmospheric pressure, and a combination thereof, and wherein the extraction agent is in a liquid state during the extraction treatment.

As used herein, the term "room temperature" refers to a temperature ranging from 10° C. to 30° C., and the term "atmospheric pressure" refers to a pressure ranging from 0.9 bar to 1.1 bar.

According to the present disclosure, examples of the fuel oil to be refined include, but are not limited to, heavy oil, hydrothermal liquefaction oil, pyrolysis oil, and recycled oil. In particular, the method of the present disclosure is highly applicable to fuel oil having a high viscosity.

According to the present disclosure, the fuel oil to be refined has light and heavy components. The light component can be extracted from the fuel oil by the extraction agent in a liquid state. The light component may include a hydrocarbon, a number of carbon of which ranges from 6 to 32. In some embodiments, the light component may be completely combusted at the atmospheric pressure and a combustion temperature equal to or less than 400° C. The heavy component may include a hydrocarbon, a number of carbon of which is equal to or greater than 33.

According to the present disclosure, the fuel to be refined may be hydrothermal liquefaction oil. Examples of the hydrothermal liquefaction oil include, but are not limited to, hydrothermal liquefaction oil which is made by virtue of hydrothermal liquefaction from organic oil sludge (e.g. waste oil sludge resulting from refinement oil fossil fuel) or from biomass. In some embodiments, the hydrothermal liquefaction oil suitable for the present disclosure has, for example, a calorific value ranging from 3000 Kcal/Kg to 10000 Kcal/Kg, a water content ranging from 0% to 30%, and a viscosity which ranges from 100 cps to 1000 cps at 100° C.

In an exemplary embodiment, the hydrothermal liquefaction oil suitable for the present disclosure is the hydrothermal liquefaction oil made from biomass. Examples of the source of the biomass include, but are not limited to, a microbial source, a plant source, an animal source, and a biological waste. Specific examples of the source of the biomass include, but are not limited to, microalgae, *Eichhornia crassipes*, oleaginous yeasts, organic sludge, food wastes, leather scraps, wastes of agriculture and forestry, and palm kernel shells. The solid content of the biomass may range from 8 wt % to 60 wt %. The particle size of the biomass may range from 1 mm to 50 mm.

Hydrothermal liquefaction is a process of liquefying biomass using a liquid which has a high ion product and which is formed from water by virtue of a high temperature and a high pressure, and converting the biomass to biomass oil having a water content ranging from 0% to 30% after solid, oil, and water separation. Hydrothermal liquefaction may be performed, according to the type and characteristics of biomass, using techniques well-known and commonly used in the art. Hydrothermal liquefaction may be conducted at a temperature ranging from 280° C. to 400° C. and at a pressure ranging from 10 bar to 200 bar.

In some embodiments, the extraction agent is the non-polar compound in a gaseous state at the room temperature and atmospheric pressure.

The non-polar compound in a gaseous state at the room temperature and atmospheric pressure may be selected from the group consisting of carbon dioxide, ethane, propane, n-butane, isobutane, neopentane, and combinations thereof.

Since the non-polar compound in a gaseous state at the room temperature and atmospheric pressure may be highly lipophilic, such compound is able to extract the light component from the fuel oil to be refined. In order to have the non-polar compound in a gaseous state converted to a liquid state for the extraction treatment, techniques well-known and commonly used in the art may be used, according to the type and phase diagram of the non-polar compound, to control at least one of conditions such as the temperature and pressure.

For example, the non-polar compound in a gaseous state at the room temperature and atmospheric pressure may be converted to a liquid state at a pressure ranging from 1 to 300 bar and at a temperature ranging from 0° C. to 200° C., on the proviso that gas-to-liquid conversion is not conducted at both the room temperature and atmospheric pressure. In some embodiments, the non-polar compound in a gaseous state at the room temperature and atmospheric pressure is converted to a liquid state at a pressure ranging from 5 to 100 bar and at a temperature ranging from 0° C. to 150° C.

According to the present disclosure, when the extraction agent is the non-polar compound in a gaseous state at the room temperature and atmospheric pressure, in some embodiments, the extraction treatment is conducted at a pressure ranging from 5 to 100 bar and at a temperature ranging from 0° C. to 200° C. In an exemplary embodiment, when the extraction agent is the non-polar compound in a gaseous state at the room temperature and atmospheric pressure, the extraction treatment is conducted at a pressure ranging from 5 to 100 bar and at a temperature ranging from 25° C. to 100° C.

According to the present disclosure, in some embodiments, the extraction treatment is conducted under stirring. The equipment and operation conditions suitable for stirring are not specifically limited. Any stirring equipments and stirring speed and time, which are suitable for the selected extraction agent and fuel to be refined and the applied ratio of the extraction agent to the fuel oil to be refined, can be used.

In other embodiments, the extraction agent is the matter composed of oil and miscible with the light component of the fuel oil. The matter composed of oil may include a hydrocarbon, a number of carbon of which ranges from 5 to 20.

The matter composed of oil and miscible with the light component of the fuel oil may be selected from the group consisting of diesel, gasoline, kerosene, and combinations thereof.

According to the present disclosure, when the extraction agent is the matter composed of oil and miscible with the light component of the fuel oil, in some embodiments, the extraction treatment is conducted at the atmospheric pressure and a temperature ranging from 25° C. to 100° C. under centrifugation. The equipment and operation conditions suitable for centrifugation are not specifically limited. Any centrifugation equipments and centrifugation speed and time, which are suitable for the selected extraction agent and fuel to be refined and the applied ratio of the extraction agent to the fuel oil to be refined, can be used.

According to the present disclosure, when the extraction agent is the matter composed of oil and miscible with the light component of the fuel oil, and/or the non-polar compound in a gaseous state at the room temperature and atmospheric pressure, the ratio of the extraction agent to the fuel oil to be refined is not specifically limited (the ratio of the extraction agent to the fuel oil to be refined can be adjusted according to the type and amount of the fuel oil to be refined). In some embodiments, the amount of the matter composed of oil and miscible with the light component of the fuel oil, and/or the amount of the non-polar compound in a gaseous state at the room temperature and atmospheric pressure may be equal to or larger than that of the fuel oil to be refined.

According to the present disclosure, during the extraction treatment, an additive may be added when the fuel oil to be refined and the extraction agent are mixed. Examples of the additive include, but are not limited to, a catalyst, a surfactant, and a oxidizing agent which are commonly used for modifying fuel oil. Since a starting material mixture formed by mixing the fuel oil to be refined with the extraction agent in a liquid state has a lower viscosity, an additive may be added during the extraction treatment to be uniformly mixed with the fuel oil in the starting material mixture so as to more easily exhibit its intended effect.

The light oil mixture, which contains the light component, can be used as a fuel. In particular, when the extraction agent in the light oil mixture is selected from the group consisting of diesel, gasoline, kerosene, ethane, propane, n-butane, and combinations thereof, the light oil mixture can be directly used as a fuel based on the following reasons: diesel, gasoline, and kerosene are fossil fuel oil; ethane is one of the major components of natural gas; and propane and n-butane are the major components of liquefied petroleum gas.

The method of the present disclosure may further comprise a separation treatment for separating the light component and the extraction agent in the light oil mixture. The light component separated can solely serve as a fuel, and the extraction agent separated can be recovered for reuse.

According to the present disclosure, when the extraction agent is the non-polar compound in a gaseous state at the room temperature and atmospheric pressure, the method of the present disclosure may comprise subjecting the light oil mixture to a separation treatment, so that the extraction agent in the light oil mixture is converted to a gas.

In order to have the extraction agent converted to a gas, techniques well-known and commonly used in the art may be used, according to the type and phase diagram of the non-polar compound in a gaseous state at the room temperature and atmospheric pressure, to control at least one of the conditions such as the temperature and pressure. In some embodiments, the separation treatment is conducted at temperature ranging from 0° C. to 90° C. and a pressure ranging from 1 to 50 bar.

According to the present disclosure, the heavy component from the fuel oil obtained after the extraction treatment may serve as asphalt for reuse.

The present disclosure will be described in more detail with reference to the following examples, which are given for the purpose of illustration only and are not intended to limit the scope of the present disclosure.

EXAMPLES

Three exemplary methods for refining fuel oil, i.e. Exemplary Methods 1 to 3, were conducted to manifest the advantages of the method of the present disclosure.

General Experimental Procedures

1. Compositional Analysis

Compositional analysis was conducted using an elemental analyzer (Elementar, model number vario EL III) according to the elemental analysis standard NIEA (National Institute for Environmental Analysis) M403.01B. The lower the nitrogen content in a matter composed of oil, the less nitrogen oxides (i.e. a pollutant) will be generated upon combustion of the matter composed of oil. The lower the sulfur content in a matter composed of oil, the less sulfur oxides (i.e. a pollutant) will be generated upon combustion of the matter composed of oil. The lower the oxygen content in a matter composed of oil, the lower the viscosity and the higher the combustion efficiency the matter composed of oil can have. The higher the carbon content in a matter composed of oil, the higher the combustion efficiency the matter composed of oil can have. The higher the hydrogen content in a matter composed of oil, the higher the combustion efficiency the matter composed of oil can have.

2. Viscosity Determination

The viscosity at 25° C. was determined using a rotational viscometer (Toki Sangyo, model number TVC-7). The lower the viscosity of a matter composed of oil, the higher the flowability the matter composed of oil can have.

3. Thermogravimetric Analysis

Thermogravimetric analysis was conducted using a thermogravimetric analyzer (PerkinElmer, model number TGA4000) according to the standard method ASTM D6375. The lower the temperature of a matter composed of oil is upon complete combustion, the less the carbon number of the hydrocarbon in the matter composed of oil is, and the higher the quality of the matter composed of oil is.

Exemplary Method 1

First, an extraction treatment was performed as follows. 5 g of fuel oil to be refined (which was hydrothermal liquefaction oil made from biomass, and which had a viscosity of 2000 cps at 25° C.) was added into a high speed homogenizing reactor. Subsequently, an extraction agent (which was liquefied propane prepared through liquefaction at a temperature of 28° C. and a pressure of 15 bar) was continuously fed into the high speed homogenizing reactor at a feed rate of 1 L/hr, to from a starting material mixture. Stirring was continuously conducted at 30° C. and 15 bar for 20 minutes, so that a light component was extracted from the fuel oil by the extraction agent. Specifically, the light component was present in a light oil mixture containing the light component and the extraction agent and formed after the extraction. During the stirring process, a suitable amount of the starting material mixture was collected from the high speed homogenizing reactor for viscosity determination according to section 2 of General Experimental Procedures. The starting material mixture had a viscosity of 450 cps.

Secondly, a separation treatment was conducted as described below. The light oil mixture was delivered to a collecting tank, which was in communication with the high speed homogenizing reactor, under a reduced pressure. The pressure and temperature of the light oil mixture in the collecting tank were respectively set to be 5 bar and 50° C., so that the extraction agent present in the light oil mixture was converted to a gas and was hence isolated from the light oil mixture for recovery and reuse, and so that the light component present in the light oil mixture was converted to a liquid and was hence separated from the extraction agent in the gaseous state. Therefore, light oil composed of the light component in the liquid state was formed.

The fuel oil to be refined and the light oil were subjected to elemental analysis, viscosity determination, and thermogravimetric analysis respectively according to sections 1 to 3 of General Experimental Procedures. The results thus obtained are shown in Table 1 and FIG. 1.

Exemplary Method 2

First, an extraction treatment and a separation treatment similar to those of Exemplary Method 1 were performed, except that the extraction agent used was liquefied carbon dioxide prepared through liquefaction at a temperature of 30° C. and a pressure of 15 bar, and that the starting material mixture formed had a viscosity of 1000 cps at 25° C.

The fuel oil to be refined and the light oil were subjected to elemental analysis and viscosity determination respectively according to sections 1 and 2 of General Experimental Procedures, and the results thus obtained are shown in Table 1.

Exemplary Method 3

An extraction step was performed as follows. 10 g of fuel oil to be refined (which was hydrothermal liquefaction oil made from biomass, and which had a viscosity of 2000 cps at 25° C.) was added into a high speed homogenizing reactor. Subsequently, 10 g of an extraction agent (which was diesel in the liquid state, and which was 5 ppm sulfur-containing diesel for automobiles obtained from Chinese Petroleum Corporation) was fed into the high speed homogenizing reactor. Stirring was continuously conducted at the atmospheric pressure and 30° C. for 20 minutes. Centrifugation was conducted at 6000 rpm using a high speed centrifuge so that a light component was extracted from the fuel oil by the extraction agent. Specifically, the light component was present in a light oil mixture containing the light component and the extraction agent and formed after the extraction.

The fuel oil to be refined and the light oil mixture were subjected to elemental analysis, viscosity determination and thermogravimetric analysis according to sections 1 to 3 of General Experimental Procedures. The results thus obtained are shown in Table 1 and FIG. 2.

Exemplary Method 4

First, an extraction treatment similar to that of Exemplary Method 3 were performed, except that the extraction agent used was gasoline in the liquid state, which was obtained from Chinese Petroleum Corporation.

The light oil mixture were subjected to viscosity determination. The light oil mixture had a viscosity of 150 cps at 25° C.

Exemplary Method 5

First, an extraction treatment similar to that of Exemplary Method 3 were performed, except that the extraction agent used was kerosene in the liquid state, which was obtained from Chinese Petroleum Corporation.

The light oil mixture were subjected to viscosity determination. The light oil mixture had a viscosity of 150 cps at 25° C.

TABLE 1

| Matter used or obtained in exemplary method | | N (%) | C (%) | S (%) | H (%) | O (%) | Viscosity at 25° C. (cps) |
|---|---|---|---|---|---|---|---|
| Exemplary Method 1 | Fuel oil to be refined | 4.991 | 67.701 | 0.66 | 9.231 | 17.42 | 2000 |
|  | Light oil | 1.001 | 75.07 | 0.65 | 12.832 | 10.444 | 150 |
| Exemplary Method 2 | Fuel oil to be refined | 4.991 | 67.701 | 0.66 | 9.231 | 17.42 | 2000 |
|  | Light oil | 4.079 | 67.80 | 0.66 | 10.134 | 15.327 | 800 |
| Exemplary Method 3 | Fuel oil to be refined | 4.991 | 67.701 | 0.66 | 9.231 | 17.42 | 2000 |
|  | Light oil mixture | 0.363 | 82.75 | 0.494 | 12.51 | 3.883 | 150 |

As shown in Table 1, compared to the fuel oil to be refined, the light oil obtained using a respective one of Exemplary Methods 1 and 2 had the following characteristics: a lower nitrogen content which could lead to generation of less nitrogen oxides during combustion of the light oil; a lower oxygen content which could confer a lower viscosity and higher combustion efficiency on the light oil; and a higher carbon content and a higher hydrogen content which could confer higher combustion efficiency on the light oil. The results indicate that by virtue of the method for refining fuel oil according to the present disclosure, light oil having a satisfactory overall quality and a sufficiently low viscosity can be obtained from fuel oil.

Furthermore, compared to the fuel oil to be refined, the light oil mixture obtained using Exemplary Method 3 had the following characteristics: a lower nitrogen content which could lead to generation of less nitrogen oxides during combustion of the light oil mixture; a lower oxygen content which could confer a lower viscosity and higher combustion efficiency on the light oil mixture; and a higher carbon content and a higher hydrogen content which could confer higher combustion efficiency on the light oil mixture. The results indicate that by virtue of the method for refining fuel oil according to the present disclosure, a light oil mixture having a satisfactory overall quality and a sufficiently low viscosity can be obtained from fuel oil. Moreover, compared to the light oil obtained using each of Exemplary Methods 1 and 2 (which respectively employed liquefied propane and liquefied carbon dioxide as extraction agents), the light oil mixture obtained using Exemplary Method 3 (which employed diesel as an extraction agent) had a lower nitrogen content, a lower oxygen content, and a lower sulfur content, thereby having a better quality.

In addition, it should be noted that the hydrothermal liquefaction oil made from biomass, which served as the fuel oil to be refined in Exemplary Methods 1 to 3 and had a viscosity of 2000 cps at 25° C., was hardly flowable at 25° C. and hence was not easily applicable. Nevertheless, via Exemplary Methods 1 and 2, the hydrothermal liquefaction oil made from biomass was refined and transformed into light oil having a significantly lower viscosity at 25° C. (150 cps or 800 cps), indicating that light oil obtained by virtue of the method for refining fuel oil according to the present disclosure has a satisfactory flowability and hence can be more widely applied. Likewise, via Exemplary Method 3, the hydrothermal liquefaction oil made from biomass was refined and transformed into a light oil mixture having a significantly lower viscosity at 25° C. (150 cps), indicating that a light oil mixture obtained by virtue of the method for refining fuel oil according to the present disclosure has a satisfactory flowability and hence can be more widely applied.

Referring to FIG. 1, since the hydrothermal liquefaction oil made from biomass, which served as the fuel oil to be refined in Exemplary Method 1, had a heavy component, 30% of the hydrothermal liquefaction oil made from biomass had yet to be combusted at 500° C. On the other hand, the composition of the light oil obtained by virtue of Exemplary Method 1 was very similar to the composition of the light component of the hydrothermal liquefaction oil made from biomass, and hence only 10% of the light oil had yet to be combusted at 500° C. The light oil was substantially completely combusted at about 650° C. The result of thermogravimetric analysis manifests that the light oil obtained via the method for refining fuel oil according to the present disclosure can achieve an excellent quality of combustion.

Figure 2:
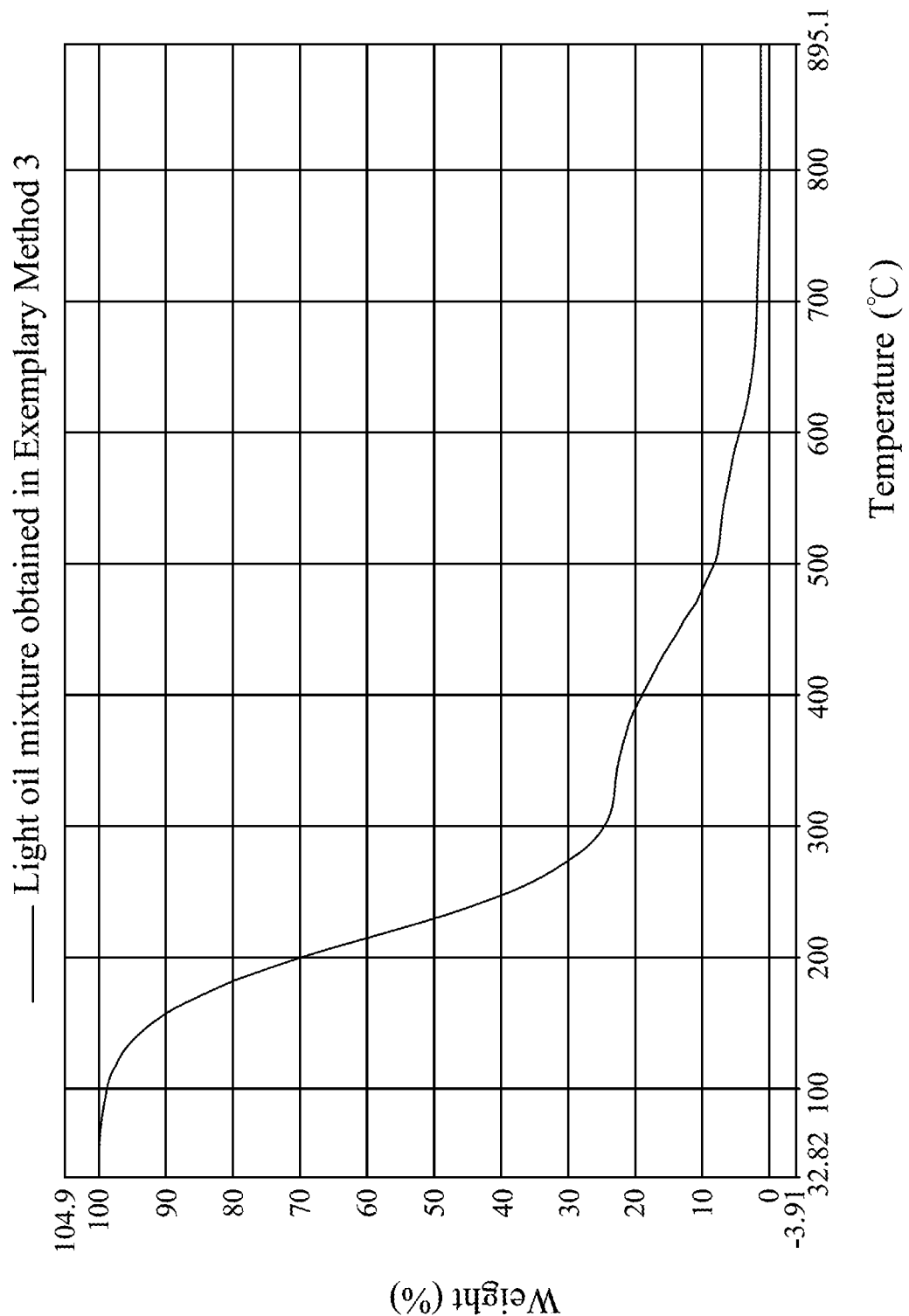
FIG. 2 is a thermogravimetric analysis diagram of a light oil mixture obtained in Exemplary Method 3 of the present disclosure.

Turning to FIG. 2, only less than 25% of the light oil mixture obtained by virtue of Exemplary Method 3 was not combusted at 300° C., and such light oil mixture was completely combusted at about 700° C. The result of thermogravimetric analysis indicates that the light oil mixture obtained via the method for refining fuel oil according to the present disclosure can achieve an excellent quality of combustion, and has combustion efficiency similar to that of diesel.

Due to the high viscosity at 25° C. (2000 cps) of the hydrothermal liquefaction oil made from biomass, which served as the fuel oil to be refined. In the exemplary methods, it would be hardly feasible to uniformly mix an additive (such as a catalyst, a surfactant, an oxidizing agent, etc.) with the hydrothermal liquefaction oil made from biomass. Nevertheless, since the starting material mixture formed by mixing the hydrothermal liquefaction oil made from biomass with the extraction agent had a lower viscosity (450 cps or 1000 cps), an additive could be uniformly mixed with the starting material mixture to more easily exhibit its intended effect. For instance, an oxidizing agent could be uniformly mixed with the starting material mixture to increase the degree of oxidization of a sulfide originating from the hydrothermal liquefaction oil made from biomass and to further enhance the efficiency of subsequent desulfurization.

In view of the foregoing, by virtue of the method for refining fuel oil according to the present disclosure, a light oil mixture containing a light component extracted from fuel oil and an extraction agent for such extraction (which is in a liquid state during extraction) can be obtained, and can be used as a fuel due to its lower viscosity and higher combustion efficiency (compared to the fuel oil). Alternatively, the light component and the extraction agent in the light oil mixture may be separated, so that the light component forms light oil, the composition of which is very similar to that of the light component, and which can be used as a fuel due to its lower viscosity and higher combustion efficiency (compared to the fuel oil). Either the light oil mixture or the light oil leads to less pollutant upon combustion compared to the fuel oil. In addition, the method for refining fuel oil according to the present disclosure can dispense with a supercritical fluid and be cost-effective.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for refining fuel oil, comprising:
   subjecting fuel oil to an extraction treatment with an extraction agent to extract a light component from the fuel oil, so as to obtain a light oil mixture containing the light component of the fuel oil and the extraction agent,
   wherein the extraction agent is a matter composed of oil and miscible with the light component of the fuel oil, the matter composed of oil and miscible with the light component of the fuel oil including a hydrocarbon, a number of carbon of which ranges from 5 to 20, the matter composed of oil and miscible with the light component of the fuel oil being selected from the group consisting of diesel, gasoline, kerosene, and combinations thereof,
   wherein the extraction agent is in a liquid state during the extraction treatment, and
   wherein the extraction treatment is conducted at an atmospheric pressure and a temperature ranging from 25° C. to 100° C. under centrifugation.

2. The method according to claim 1, wherein the fuel oil is selected from the group consisting of heavy oil, hydrothermal liquefaction oil, pyrolysis oil, recycled oil and combination thereof, the heavy oil being petroleum with American Petroleum Institute (API) gravity of lower than 20.

3. The method according to claim 2, wherein the fuel oil is the hydrothermal liquefaction oil.

4. The method according to claim 1, wherein the fuel oil includes a hydrocarbon, a number of carbon of which is not less than 33.

5. The method according to claim 1, wherein the light component includes a hydrocarbon, a number of carbon of which ranges from 6 to 32.

6. A method for refining fuel oil, comprising:
   subjecting fuel oil to an extraction treatment with an extraction agent to extract a light component from the fuel oil, so as to obtain a light oil mixture containing the light component of the fuel oil and the extraction agent,
   wherein the extraction agent is selected from the group consisting of a matter composed of oil and miscible with the light component of the fuel oil, a non-polar compound in a gaseous state at a room temperature and an atmospheric pressure, and a combination thereof, and
   wherein the extraction agent is in a liquid state during the extraction treatment,
   wherein the fuel oil is hydrothermal liquefaction oil.

7. The method according to claim 6, wherein the extraction agent is the non-polar compound in a gaseous state at the room temperature and atmospheric pressure, and the non-polar compound in a gaseous state at the room temperature and atmospheric pressure is selected from the group consisting of carbon dioxide, ethane, propane, n-butane, isobutane, neopentane, and combinations thereof.

8. The method according to claim 7, wherein the non-polar compound in a gaseous state at the room temperature and atmospheric pressure is convertible to a liquid state at a pressure ranging from 1 to 300 bar and at a temperature ranging from 0° C. to 200° C., on the proviso that gas-to-liquid conversion is not conductible at both the room temperature and atmospheric pressure.

9. The method according to claim 7, wherein the extraction treatment is conducted at a pressure ranging from 5 to 100 bar and at a temperature ranging from 0° C. to 200° C.

10. The method according to claim 7, further comprising subjecting the light oil mixture to a separation treatment, so that the extraction agent in the light oil mixture is converted to a gas.

11. The method according to claim 10, wherein the separation treatment is conducted at a temperature ranging from 0° C. to 90° C. and at a pressure ranging from 1 to 50 bar.

12. The method according to claim 6, wherein the extraction agent is the matter composed of oil and miscible with the light component of the fuel oil, and the matter composed of oil and miscible with the light component of the fuel oil includes a hydrocarbon, a number of carbon of which ranges from 5 to 20.

13. The method according to claim 12, wherein the matter composed of oil and miscible with the light component of the fuel oil is selected from the group consisting of diesel, gasoline, kerosene, and combinations thereof.

14. The method according to claim 13, wherein the extraction treatment is conducted at the atmospheric pressure and a temperature ranging from 25° C. to 100° C. under centrifugation.

15. The method according to claim 6, wherein the light component includes a hydrocarbon, a number of carbon of which ranges from 6 to 32.

* * * * *